Patented Nov. 30, 1943

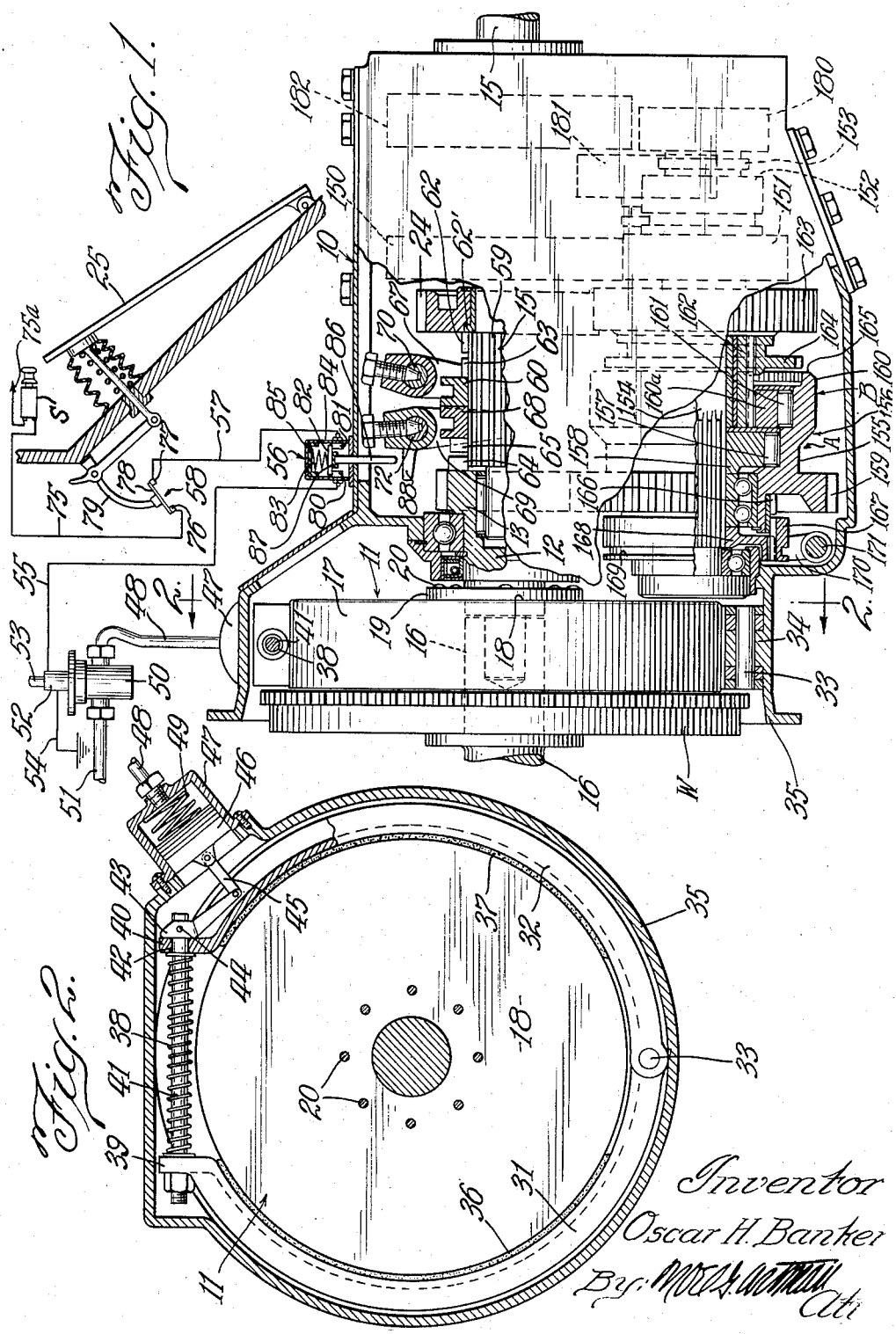

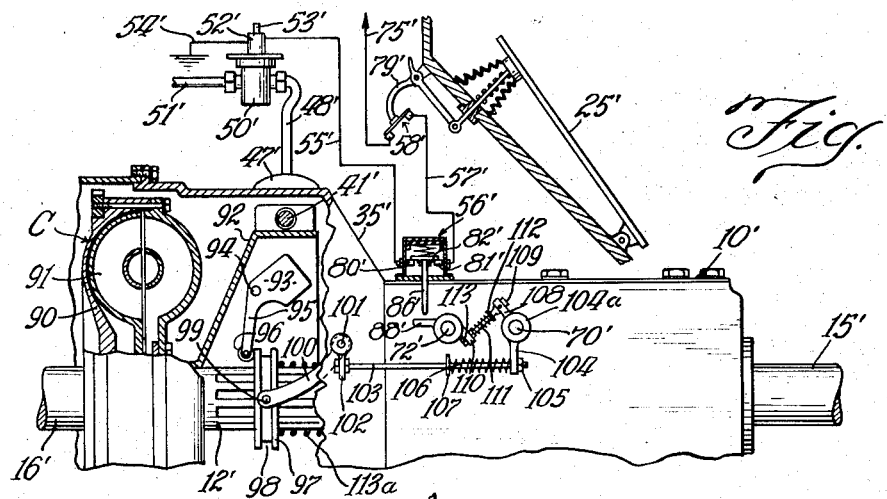

2,335,255

UNITED STATES PATENT OFFICE 2,335,255

CHANGE-SPEED TRANSMISSION CONTROL

Oscar H. Banker, Chicago, Ill., assignor to New Products Corporation, Chicago, Ill., a corporation of Delaware Application December 29, 1939, Serial No. 311,625

25 Claims. (Cl. 192—.01)

This invention related to control apparatus for motor vehicle change-speed gearing and has more particularly to do with means for automatically braking the drive shaft of such gearing as an expedient for quickly synchronizing parts which are to be connected for establishing a higher ratio power train upon the closing of the motor throttle.

The invention is particularly useful when used in combination with an automatic change-speed transmission of the character disclosed in my United States Patent No. 2,140,502. Such a transmission (having three speeds) employs an over-running clutch in each of its two lower ratio power trains and a bevel tooth jaw clutch in each of its two higher ratio power trains. Speed responsive means is provided for urging the teeth of these jaw clutches into mesh when the transmission tail shaft (or vehicle road wheels) attains a predetermined rotative speed. When, for instance, the vehicle is proceeding with the first speed power train connected, and at such speed that the teeth of the second speed power train jaw clutch are being urged into mesh, such second speed power train can be established by permitting the vehicle engine throttle to close and the engine to decelerate until the driving part of the second speed jaw clutch slows down to synchronism with the driven part thereof, whereupon the teeth of this clutch slide into mesh. Thereafter the throttle may be opened for causing the engine to apply power through the second speed power train. When the vehicular speed is increased as desired, the third speed jaw clutch being urged into mesh as above mentioned, the third speed train can be established by again permitting the engine throttle to close and the engine to decelerate for bringing the third speed clutch parts to synchronism at which instant the teeth of this clutch slide into mesh. A direct transfer from the lowest to the highest ratio power train can be effected by driving the vehicle sufficiently fast in the lowest train to cause the speed responsive means to urge the jaw clutches into mesh and then letting the throttle remain closed long enough for the parts of the highest train clutch to reach synchronism.

It will be realized from the foregoing that a transfer or shift from one power train to another necessarily involves a time interval determined by the inherent deceleration rate of the vehicle engine. Sometimes this interval, during which the flow of power from the engine to the vehicle road wheels is interrupted, is greater than the driver likes—especially when an exceptionally fast "get-away" is desired. A further reason for shortening the period in which the jaw clutch parts are brought to synchronism is to make it easier for the driver to judge when the higher power train has been established so the engine will not be prematurely accelerated. The shorter the time period, the more accurate will be the driver's judgment.

An object of the present invention is the provision of power actuated means for braking the drive shaft of a transmission as the above, and becoming effective when the operator permits the engine throttle to close to initiate shifting into a higher ratio power train.

An additional object of this invention is the provision in such a braking apparatus of means for preventing its actuation when the transmission is connected through its highest ratio train.

A further object of the invention is the provision of a braking apparatus as the above which, when employed with a speed responsive clutch which operatively connects the transmission drive shaft with the vehicle engine only when the engine is operating at or above a predetermined speed, acts through the lower ratio forward power train as a "no-back" vehicle brake when the engine is operating too slowly to engage said speed responsive clutch.

A further object of this invention is the provision of a braking apparatus, cooperable with the driving element of a speed responsive engine clutch, for braking the transmission drive shaft when the engine throttle is closed to initiate a shift from a lower to a higher ratio power train, and wherein means are provided for preventing actuation of the braking apparatus excepting when the engine is operating at sufficient speed for causing said clutch to be closed.

A further object of the invention is the provision of a transmission drive shaft braking apparatus becoming effective upon the closing of the engine throttle incident to shifting between forward and reverse power trains and vice versa to quickly decelerate parts to be engaged with parts substantially at rest and thus facilitate such shifting.

A still further object of the invention is the provision of a transmission drive shaft braking apparatus operative as a vehicle service brake through either the reverse power train or the first speed forward power train for automatically stopping the vehicle upon release of the engine clutch and the closing of the engine throttle, when the over-running feature of such trains is rendered inoperative.

My invention, in its preferred forms, will now be described with reference to the two sheets of drawings annexed hereto, and wherein:

Fig. 1 is a side elevation of a change-speed transmission and clutch combined with one embodiment of my invention, there being parts broken away for clarity;

Fig. 2 is a sectional view taken on the line 2—2 of Fig. 1;

Fig. 3 is a fragmentary sectional view showing an interlock linkage which functions to prevent engagement of the jaws in either the second or third speed power trains while the over-running clutch in the first speed power train is shunted by a two-way drive clutch.

Fig. 4 is a fragmentary side elevational view of a fluid coupling and transmission embodying a second form of the invention;

Fig. 5 is a fragmentary side elevational view of a centrifugal friction clutch and transmission embodying a third embodiment of the invention, the braking means being cooperative with the driving part of the clutch; and Fig. 6 is a sectional view taken on the line 6—6 of Fig. 5, illustrating the mechanical movement of the clutch.

The first form of the invention, shown in Figs. 1, 2 and 3, is associated with a change-speed transmission generally designated 10 and a centrifugal or speed responsive friction clutch generally designated 11. Said transmission 10 is of the countershaft type, shown and fully described in my United States Patent No. 2,140,502, excepting for a two-way drive connecting means, conditionable for bridging the first speed power train over-running clutch and which is fully described herein.

Briefly, the drive shaft 12 of this transmission comprises an integral gear 13 which drives a countershaft assembly illustrated partly by dotted lines in the lower part of Fig. 1. The first speed power train includes a gear 150 splined to the driven shaft 15. Said gear 150 is drivable from its mated countershaft gear 151 when a jaw clutch coupling member 152, which is splined to the hub of the gear 151, is slid backwardly over and into clutching relation with a jaw clutch member 153 which is splined to the countershaft 154. This countershaft is drivable from the reduced portion 155 of a compound over-running clutch driver member 156 through over-running clutch rollers 157 and a cam actuating member 158 which is splined to the shaft 154. The parts 155, 157 and 158 will be referred to as over-running clutch A, or as the first speed power train over-running clutch. Said compound member 156 is integral with a gear 159 which is driven from the gear 13. The over-running clutch A is disposed in series with the first speed power train to enable that portion of said train including the member 156 and the gears 159 and 13 to be over-run by the remainder of the power train when the second speed power train, now to be described, is connected between the transmission driving and driven shafts and without disturbing the meshed relation of the gears 150 and 151.

The second speed power train includes an over-running clutch B of which the driver member is formed by the enlarged portion 160 of the compound member 156. The driven member 160a of this second speed over-running clutch B is driven through clutch rollers 161 and is connected with the hub 162 of a second speed gear 163, freely rotatable on the countershaft 154. This gear 163 is mated with a second speed gear 24 which is freely rotatable upon the driven shaft 15. Said over-running clutch B enables said driver member 160 and the gears 159 and 13 to be over-run by the other rotating parts of the second speed power train including the gears 24 and 163 without disturbing the meshed relation of these gears when the drive and driven shafts 12 and 15 are connected directly for establishing the third or highest ratio train. The second speed power train is established by rotating a control shaft 70 and the shifter fork 67 thereon counter-clockwise to slide a jaw clutch member 60 backwardly or to the right in Fig. 1. This jaw clutch member 60 is splined to the driven shaft 15 at its splined section 59 and has circumferentially spaced and axially extending clutch teeth 63 which mesh with similar teeth 62 of a jaw clutch member 62' which is non-rotatively secured to the gear 24. This clutch member 62' and the gear 24 are free to spin about the driven shaft 15 when the clutch teeth 62 and 63 are not meshed.

The third or direct driving power train is established when a control shaft 72 and a shifter fork 69 thereon are rotated clockwise to shift a jaw clutch member 68, which is splined at 59 to the driven shaft 15, forwardly for meshing the teeth 65 thereof with the clutch teeth 64 projecting axially from the gear 13.

A jaw clutch member 164, splined to the hub 162 of gear 163, is slidable into mesh with a jaw clutch member 165 on the driver 160 of the over-running clutch B to bridge said clutch B for rendering the second speed power train capable of transmitting power in either direction. This jaw clutch 164—165 and its controls (not shown), fully described in said Patent No. 2,140,502, are not concerned with the present invention.

Another jaw clutch, not shown in the Patent No. 2,140,502, is provided for bridging the first speed over-running clutch A. This clutch consists of a toothed member 166 fixed to the gear 159 and meshable by an internally toothed ring member 167 axially slidable upon a carrier 168 which is splined to the countershaft 154. The clutch ring 167 has a groove 169 which receives opposite end portions of a shifter fork 170 which is rotatable clockwise with its control shaft 171 for shifting the clutch ring 167 rearwardly into mesh with the complemental clutch member 166. Shaft 171 is manually rotatable by control means (not shown) reaching into the vehicle driver's compartment. One section of the shaft 171 non-rotatively carries an arm 172, Fig. 3, which is pivotally connected with an end of a link 173 having its other end connected with a lock-out lever 174 through a lost motion arrangement consisting of a pin 175 projecting from the lever 174 into an elongated opening 176 in the link 173. The lever 174 is rotatably mounted on a stub shaft 177 anchored to the gear box. When the shaft 171 is rotated clockwise for meshing the jaw clutch members 166 and 167, the arm 172 acts through the link 173 for rotating the lever 174 clockwise into the position shown in dotted outline for abutting against stop members 178 and 179 and preventing rotation of the governor actuated control shafts 72 and 70 so the second and third speed clutch members 60 and 68 under control of these shafts cannot be thrust against the teeth of their cooperative clutch members. Thus the second and third speed jaw clutches are prevented from uselessly ratcheting while the first speed power train is locked in operative condition.

A reverse power train includes a gear 180 non-rotatively secured to the countershaft 154, an axially slidable idler gear 181 and a gear 182 non-rotatively secured to the driven shaft 15. The idler gear 181, when slid rearwardly, meshes with the gears 180 and 182 for establishing the reverse power train. Interlocking means which is shown and described in said Patent No. 2,140,502 is provided for axially sliding the coupling member 152 and the idler gear 181. With these parts in the position shown the transmission is arranged in neutral. When the interlocking means is actuated for sliding the coupling member 152 backwardly into meshed relation with the jaw clutch member 153 for establishing the first speed power train the gear 181 will be left in the unmeshed position shown, and when the gear 181 is slid backwardly into mesh with the gears 180 and 182 for establishing the reverse speed power train the coupling member 152 will be left in the position shown.

Power is transmitted to this transmission mechanism from an engine crank shaft 16 through the automatic speed responsive clutch 11 and the transmission drive shaft 12. A flywheel W is also driven by the engine shaft 16. The clutch 11 may be of the character disclosed in my U. S. Patent No. 2,042,454. Centrifugal weights (not shown), disposed upon a carrier rotated by the engine shaft 16, cause the engagement of driver friction members with the inner periphery of a drum or clutch driven member 17 when the engine speed reaches a predetermined minimum suitable for taking up the load of the vehicle through the transmission. This driven clutch drum 17 has an end plate 18 which is connected to the flange 19 of the transmission drive shaft 12 by means of bolts 20.

During a normal operation of the transmission and of the clutch 11, after the lowest ratio power train has been established, the vehicle engine will be brought up to speed by depressing a foot accelerator pedal 25. When the engine attains said predetermined minimum speed the driven drum 17 will be frictionally engaged and take motion from the engine. Power will then be transmitted through the drive shaft 12, the gear 13 and other parts included in the first speed power train to the driven shaft 15. After the vehicle reaches a certain predetermined speed, the driven shaft 15 will be rotated at such a speed as to actuate a speed responsive mechanism (not shown), which then yieldingly urges the control shaft 70 to rotate counter-clockwise and the control shaft 72 to rotate clockwise. In this manner the clutch teeth 63 are carried endwise to abut their end faces against the end faces of the clutch teeth 62. Likewise, the end faces of the clutch teeth 65 are brought into abutting relation with the end faces of the clutch teeth 64. At this time in the operation of the transmission the clutch member 62' will be rotating faster than the driven shaft 15 so that the teeth 62 ratchet past the teeth 63. Similarly, the teeth 64 ratchet past the teeth 65. The abutting end faces of the teeth 62, 63, 64 and 65 are beveled as shown in said Patent No. 2,140,502 to facilitate this ratcheting action without noise.

When the operator wishes to shift into the second speed connection, the accelerator pedal 25 is released to permit the closing of the engine throttle whereupon the engine, clutch 11, drive shaft 12, gear 13, second speed gear 24 and the jaw clutch member 62' decelerate while the driven shaft 15 which is connected with the vehicle road wheels and the clutch member 60, which is splined to said shaft, maintain substantially constant speed. When the vehicle engine slows down sufficiently for the clutch member 62' to synchronize with the clutch member 60, the above mentioned yielding force urging the teeth 63 against the ends of the teeth 62 will cause the teeth 63 to slide into mesh with the teeth 62 incident to establishing the second speed power train.

After the second speed power train is thus established power is transmittable thereby from the engine to the road wheels when the operator again presses the accelerator pedal for opening the engine throttle.

A shift into the direct or highest ratio power train is accomplished by the operator again releasing the pedal 25, whereupon the engine and the gear 13 connected therewith slow down, as permitted by the over-running clutch B in the second speed power train, while the driven shaft 15 and the clutch member 68 splined thereto continue to rotate at substantially the same speed. When the engine slows down to the speed corresponding to said highest ratio, the clutch teeth 64 will synchronize with the clutch teeth 65 whereupon the latter are forced into mesh with the former by the yieldable urging means referred to above. The highest ratio power train will then be established.

It will be observed that had the operator, in making the shift from the first speed train to the second speed train, allowed the throttle to remain closed sufficiently long, the clutch teeth 64 would eventually have slowed down to synchronism with the teeth 65, and a transfer would have been made directly from the first to the third speed connection.

Thus far the description has dealt only with apparatus disclosed in the patented art, with the exception of the jaw clutch comprising the members 166 and 167 for shunting out the over-running clutch A, and the connection thereof with the inter-lock mechanism shown in Fig. 3. A description will now be given of braking apparatus operating under control of the accelerator pedal 25 for more quickly decelerating the transmission drive shaft 12 incident to the changing of power trains, and for serving as a service brake through the first speed or reverse power trains when either of these trains is established and the jaw clutch members 166 and 167 are meshed. Said members are normally out of mesh.

The braking force for this purpose is applied to the clutch driven drum 17 by means of a pair of curved shoes 31 and 32, Fig. 2, which partially embrace this drum. These shoes are pivoted at their lower ends to a pin 33 which is anchored in a lug 34 within and upon the lower side of the bell housing 35. Elements 36 and 37 of suitable friction material are used for facing the inner sides of the shoes 31 and 32. An expansion spring 38 acting between ears 39 and 40 on the upper ends of the pivoted members 31 and 32 normally spreads them apart so the friction elements 36 and 37 are held out of engagement with the drum 17. A bolt 41, surrounded by the spring 38, has one end anchored in the ear 39 and a section near its other end slidably disposed in an opening 42 within the ear 40. A lever 43 is pivotally connected to the bolt 41 by means of a pin 44. One end of the lever 43 is connected by a link 45 with a piston 46 within a cylinder 47 which is suitably secured to the bell housing 35. A conduit 48 communicates with the cylinder 47 above the piston 46. Normally the piston 46 is held downwardly in the position shown by means of a spring 49, but when the upper section of the cylinder 47 communicates through said conduit 48 with a reduced pressure source, the piston 46 will be forced upwardly within the cylinder to pivot the lever 43 counter-clockwise for drawing the two ears 39 and 40 toward one another while frictionally applying the elements 36 and 37 against the periphery of the drum 17 to diminish its rate of rotation.

Communication of the cylinder 47 with a low pressure source, such as the intake manifold of the vehicle engine, is controlled by a valve generally designated 50 in Fig. 1. When this valve is opened a conduit 51 leading from the low pressure source is made communicative with the conduit 48 which in turn leads to the cylinder 47. Valve 50 is opened or closed under control of a solenoid 52 which surrounds and acts electromagnetically upon an axially movable plunger 53. When the solenoid 52 is energized the plunger or valve operating rod 53 is forced downwardly, against spring pressure, for opening the valve 50. The essential structure of this valve is shown in detail in my United States Patent No. 2,171,534.

Energization of the solenoid 52 is accomplished by means of a series circuit including a conductor 54 which leads from ground to one side of the solenoid, a conductor 55, a switch generally designated 56, a conductor 57, a switch generally designated 58, a conductor 75, manually operated switch S and a conductor 75a which is connected with a source of potential above ground through the vehicle ignition switch when the latter is in position for completing the ignition circuit.

The switch 58 has contacts 76 and 77 which are connected together through a conductor bridge 78 when the accelerator pedal 25 is in the released position shown wherefore the bell crank lever 79 is at the counter-clockwise limit of its pivotal range.

The switch 56 comprises contacts 80 and 81 which are bridged by an electrical conductor bridge 82 at all times excepting when the shifter fork 69 is pivoted clockwise for establishing the highest ratio power train. The bridge 82 is normally held downwardly against the contacts 80 and 81 by a spring 83 which is insulated from the contacts 80 and 81 by the walls of the switch case 84 and a block 85 which are insulating material. A switch operating stem 86 is secured to and insulated from the bridge 82 by a block of insulating material 87, said stem extending downwardly into opposed relation with a stud 88 which projects forwardly from said shifter fork 69.

It will be understood that the electric circuit for energizing the solenoid 52 may be completed only when both the switches 56 and 58 are closed. Switch 58 is closed at all times when the accelerator pedal is released for closing the engine throttle. Switch 56 is closed at all times excepting when the third speed or highest ratio power train of the transmission is established. Therefore, when the accelerator pedal is released to cause closing of the engine throttle incident to shifting from the first speed to the second speed power train, both the switches 56 and 58 are closed whereby the solenoid 52 is energized and pulls the plunger 53 downwardly for opening the valve 50 whereupon the section of the cylinder 47 above the piston 46 is subjected to low pressure. In this manner the piston 46 is forced upwardly and applies the friction brake elements 36 and 37 upon the drum 17 comprising the driven part of the clutch 11. Thus the drum 17 and the transmission drive shaft 12 are frictionally connected with the bell housing 35 and their rate of rotation quickly decreased. Normally the clutch 11 will remain engaged wherefore this braking effect upon the clutch drum 17 will increase the deceleration rate of the vehicle engine as well as that of the jaw clutch member 62' and other parts of the second speed power train. The clutch member 62', therefore, will quickly slow down to synchronism with the clutch member 60 to enable the teeth 63 to slide into mesh with the teeth 62 for establishing the second speed power train.

When the second speed power train is established the operator may accelerate by again pressing upon the accelerator pedal 25 to apply power through said power train, and in doing so, will open the switch 58 to deenergize the solenoid 52 and close the valve 50 so the braking force is released from the clutch drum 17.

Subsequently, when the operator wishes to change into the third speed connection and hence releases the accelerator pedal 25, the circuit including the switches 56 and 58 is again completed to cause opening of the valve 50 and the application of the brake to the clutch drum 17 for slowing down the vehicle engine, clutch 11 and the gear 13 to the speed of the transmission driven shaft 15 whereupon the clutch teeth 65 readily slide into mesh with the clutch teeth 64. At this time the third or highest ratio power train will be established.

In establishing this third speed power train the shifter fork 69 is rotated clockwise to abut against the stem 86 and elevate the electrical conductor bridge 82 of the switch 56 out of engagement with the contacts 80 and 81, thus making it impossible to close the electric circuit irrespective of the condition of the switch 58. Therefore, after the transmission has been connected in its highest or cruising ratio the operator may release the accelerator pedal 25 without the brake being applied to the clutch drum 17.

If the operator should be starting the vehicle up hill, and, after engaging the first speed power train, should release the accelerator pedal 25, the clutch 11 would disengage when the engine had slowed down to idling speed, and the braking force applied to the drum 17 would become effective through the first speed power train to prevent the vehicle's rolling backwardly down the hill. The vehicle may thus be held on the hillside without use of the conventional foot or emergency brakes. This arrangement makes it impossible for the driver, when starting under conditions of this kind, to overload the engine and cause it to stop because of his becoming confused.

A similar condition of vehicle braking exists with respect to the reverse power train if the operator should start to back the vevicle up hill.

When the first speed over-running clutch A is shunted out by the jaw clutch 166—167, the braking action upon the clutch drum 17 will be effective through either the first speed or the reverse power trains for resisting either forward or backward vehicle movement. This feature of the apparatus is particularly useful when the vehicle is to proceed over a rough, uneven course, making it necessary to keep the vehicle under close supervision. Under such circumstances the operator will manipulate the control for rotating the shaft 171, Figs. 1 and 3, to engage the clutch 166—167. Thereafter, for example, when the vehicle has ascended a steep hump or incline in said course and is upon the brink of a sharp decline the mere release of the accelerator pedal will apply the brake to the drum 17 so the vehicle will proceed slowly down the decline without the necessity of applying the normal service brake. If the operator so desire he may leave the accelerator pedal released sufficiently long to permit the braking action on the drum 17 to bring the vehicle to a complete stop for the automatic clutch 11 will disengage when the engine slows down to idling speed while the braking action on the drum continues to act through the first speed power train to resist rotation of the road wheels.

It is also to be noted that this braking action upon the clutch drum 17, when the accelerator pedal 25 is released, also expedites synchronization of both the reverse and the first speed forward toothed members (the gear 180 and the jaw clutch member 153) and their respective mating toothed members (the gear 182 connectable with the gear 180 by the idler gear 181, and the jaw coupling member 152) which are connected for positive rotation with the driven shaft 15. That is, when starting either forwardly or backwardly, the driven shaft 15 will be substantially at rest and the engine driven parts to be connected with this shaft for driving it either forwardly or backwardly must therefore be decelerated to substantially zero speed before being connected therewith. The above described braking action upon the driven drum 17 of the clutch 11 is effective for quickly slowing down these parts to the required speed following engine "warm-up" at speeds sufficient to engage the clutch 11 or between quick shifts between reverse and forward.

While I have shown and described a brake actuating motor comprising a piston 46 and a cylinder 47 operable when subjected to a reduced pressure source, a motor operable when subjected to pressure fluid is also contemplated, and may be used without departing from the spirit of this invention. This also applies to the other embodiments of the invention now to be described.

A second embodiment of the invention is illustrated in Fig. 3 in combination with a fluid coupling clutch C and a transmission 10' similar to that shown in Fig. 1. The control shafts 70' and 72' respectively correspond to the shafts 70 and 72 shown in Fig. 1. In fact, all parts in Fig. 3 that are indicated by reference characters including a prime correspond to parts in Figs. 1 and 2 having the same respective reference characters without the prime.

The fluid coupling C comprises an impeller or driving member 90 and a runner or driven member 91. These driving and driven members of the fluid coupling may be of any well-known standard structure. The driving member 90 of this coupling is fixed upon the engine crank shaft 16'. The driven member 91 is operatively connected with the transmission drive shaft 12'. Also connected with the coupling driven member 91 and with the shaft 12' for mutual rotation, is a brake drum 92 which is adapted to be braked by a braking mechanism similar to that described with reference to Figs. 1 and 2. The brake drum 92 carries centrifugal weights as 93 which are pivoted internally of the drum upon pins as 94. Each of these weights 93 has an arm 95 in which is journalled a roller 96 for bearing against a shifter ring 97 which is splined to the shaft 12'. When the drive shaft 12' attains a predetermined speed, the weights 93 will be thrown centrifugally outwardly while pivoting about their pins 94 and causing their rollers 96 to press the member 97 backwardly. A groove 98 in the shifter ring 97 receives diametrically opposite pins 99 anchored in the ends of the legs of a shifter fork 100. The fork 100 is secured to shaft 101 which is pivotally supported in a bell housing 35'. An arm 102 is non-rotatively secured to an end section of the shaft 101 projecting outwardly through said bell housing. The arm 102 connects with one end of a bolt 103 which is slidably associated with an apertured arm 104 of a lever 104a. Said lever 104a is non-rotatively secured to the control shaft 70'. A nut 105 threaded onto the end of the bolt 103 limits movement thereof relatively to the arm 104 in one direction. A compression spring 106 surrounding the bolt abuts against a stop member 107 anchored to said bolt 103 and against one side of the arm 104, thereby constantly urging the bolt to the reciprocal limit determined by the nut 105. An arm 108 of the lever 104a is pivotally connected with one end of a bolt 109 which is slidably disposed in an apertured arm 110. Arm 110 is non-rotatively secured to the control shaft 72'. A compressing spring 111 surrounding a section of the bolt 109 abuts against a stop member 112 and the arm 110 to yieldingly hold such arm against a stop nut 113.

It will be seen that when the transmission drive shaft 12' is rotated at sufficient speed to cause the inertia weights to throw radially outwardly for pressing the shifter ring 97 backwardly against the force of a spring 113a, the fork 100 will be pivoted counter-clockwise as will the arm 102 whereby the bolt 103 will be moved axially backwardly. This movement of the bolt 103 causes the spring 106 to apply a yielding force against the arm 104 and thus tend to rotate the lever 104a counter-clockwise. When the operator shifts from first to second speed the accelerator pedal 25' is released closing the switch 58' and energizing the solenoid 52' to indirectly cause application of the brake upon the drum 92 in the manner hereinabove described in connection with the first embodiment of the invention. Incident to establishment of the second speed power train, the control shaft 70' and the lever 104a rotate counter-clockwise under the influence of the spring 106, and in doing so the bolt 109 is moved forwardly to compress the spring 111 by forcing it against the lever arm 110. When the third speed power train is to be established the thus compressed spring 111 is effective for accomplishing this by rotating the arm 110 and the control shaft 72' clockwise. A lug 88 rotatable with the control shaft 72' abuts against and lifts the switch stem 86' for demobilizing the electric circuit when the third speed power train is connected, thus making it impossible for the braking means to act upon the drum 92 when the accelerator pedal 25' is released.

In a third embodiment of the invention the braking action is effected upon the driving member of a speed responsive clutch generally designated X. The transmission itself is the same as that described with reference to Fig. 1. Parts of the transmission and of the electrical control circuit corresponding to the parts shown in Figs. 1 and 2 are designated by the same respective reference characters with a double prime added.

The engine crank shaft 16" carries a fly wheel W" which carries upon the back side thereof a plate 125 having an integral brake drum 126.

Power is transmitted through the plate 125 to a sleeve 127 which is freely rotatable upon another sleeve 128. This sleeve 127 has splined thereto the hub 129 of a plate 130 upon which centrifugal weights 131, Fig. 5, are carried by pivotally mounted shafts 132. The centrifugal mechanism including the weights 131 of this speed responsive clutch and the friction members actuated thereby are fully described in my U. S. Patent, No. 2,042,454, and therefore will be described but briefly here.

Said centrifugal weights 131 are caused to operate in unison by a linkage comprising a ring 133 freely rotatable upon the hub 129 and having oppositely disposed ears 134 which are connected by links 135 with tail portions of said weights 131. Each of the ears 134 also has pivotally connected therewith a link 136 which at its opposite end is pivotally connected with a pair of thrust members 137 and 138. The thrust members 138 connect with opposite end sections of an arcuate clutch shoe 139 whereas the thrust members 137 connect with opposite end sections of a similar shoe 140. It will be seen that when the weights 131 are thrown outwardly to pivot counter-clockwise together with their shafts 132, the links 135 will cause the ring 133 to rotate counter-clockwise whereby the links 136 are carried into a position for forcing the adjacent ends of each of the pairs of thrust members 137 and 138 radially outwardly for forcing the clutch shoes 139 and 140 against the internal periphery of a driven friction drum 142. In this manner the drum 142 is caused to be driven and drives the transmission drive shaft 12" to which it is connected through the sleeve 128 which has a splined connection therewith.

The shafts 132 rotate with the centrifugal weights 131, and it will be seen in Fig. 5 that these shafts project rearwardly through the back plate 125 of the clutch where they are connected with arms 144. Counter-clockwise rotation of the inertia weights 131 when they are thrown outwardly incident to engaging the clutch, causes similar rotation of the shafts 132 whereby each of the arms 144 is swung into the position for carrying a roller 145 thereon against an inclined section 146 of a ring 147 which is slidable axially of the shaft 12" against the urge of a compression spring 148. Therefore, when the clutch X is engaged, the ring 147 will be moved backwardly for pivoting a lever 149 about its support 150. This counter-clockwise movement of the lever 149 is effective through a switch operating stem 155 for carrying a conductor bridge 151 of a switch 152 against switch contacts 153 and 154. Said operating rod 155 is connected with the conductor member 151 by means of an insulator block 156.

The control circuit including the switches 56" and 58" and 152 is energizable for causing application of the brake upon the drum 126 only when the switch 152 is closed, and, since the switch 152 is closed only when the vehicle engine is rotating at sufficient speed for causing the automatic clutch X to be engaged, no braking force will be applied to the engine through the drum 126 when the engine is turning at a mere idling speed. Thus the switch 152 and the control parts therefor, by preventing application of the synchronizer brake at low engine speeds, make it possible to associate the brake with the engine crank shaft without incurring any possibility of the operator's stalling the engine by inadvertent release of the accelerator pedal 25" while the engine is idling or running at low speed with the first or reverse speed power trains established. In other respects the transmission apparatus shown in Figs. 4 and 5 operates similarly to that described hereinabove with respect to the lower numbered figures, there being the exception that the brake acting upon the drum 126 does not serve as a "no-back" device when the vehicle is at a stand still because there is no connection between the drum 126 and the vehicle road wheels when the clutch Y is disengaged, and for the further reason that the brake is not applied when the clutch is disengaged.

In the claims the word "throttle" either alone or as an adjective describing an engine is used in the broadest sense of that term. It means any device for varying the fuel feed to an engine and specifically includes a device which varies the flow of fuel to an engine by changes of pressure in a fuel supply line.

I claim:

1. In a change-speed transmission apparatus comprising a driving member drivable from a throttle controlled engine, a driven member and a plurality of power trains for establishing forward driving connections of different speed ratios between said members, the combination of braking means for said driving member, throttle controlling means, brake applying mechanism comprising an electric circuit including electrically controlled means energizable by the closing of such circuit to cause application of said braking means, and circuit closing means associated with said throttle controlling means and operable for closing said circuit incident to movement of the throttle controlling means substantially into the closed throttle position.

2. In a change-speed transmission apparatus comprising a driving member drivable from a throttle controlled engine, a driven member and a plurality of power trains for establishing forward driving connections of different speed ratios between said members, the combination of braking means for said driving member, throttle controlling means, brake applying mechanism actuatable to apply said braking means and comprising an electric circuit closable to cause actuation of said brake applying mechanism, and circuit closing means movable with said throttle controlling means, said circuit closing means being so constructed and arranged that it is conditioned for closing said circuit by movement of the throttle controlling means substantially into the position for closing the throttle.

3. In a change-speed transmission apparatus comprising a driving member drivable from a throttle controlled engine, a driven member and a plurality of power trains for establishing forward driving connections of different speed ratios between said members, the combination of braking means for said driving member, throttle controlling means, a source of fluid at a selected pressure, fluid actuated brake applying means operable for applying said braking means to the driving member when communicative with said fluid source, valve means electrically energizable for providing such communication between said fluid source and said brake applying means, and an electrical circuit including said valve means and a switch, said switch being movable in accordance with the movement of said throttle controlling means and conditioned for closing said circuit for energizing said valve means when the throttle controlling means is moved into position for closing said throttle.

4. In a change-speed transmission apparatus comprising a driving member drivable from a throttle controlled engine, a driven member and a plurality of power trains for establishing forward driving connections of different speed ratios between said members, the combination of braking means for said driving member, and brake applying mechanism actuatable in response to the closing of said throttle for applying said braking means to said driving member, and said brake applying mechanism also being responsive to the condition of the highest ratio power train to become incapable of such actuation when such power train is established.

5. In a change-speed transmission apparatus comprising a driving member drivable from a throttle controlled engine, a driven member and a plurality of power trains for establishing forward driving connections of different speed ratios between said members, the combination of braking means for decelerating said driving member to the proper speed relatively to said driven member incident to a change from a lower to a higher ratio power train, brake applying means actuatable to apply said brake, and an electric circuit including electrically controlled means energizable by the closing of said circuit for causing said braking means to decelerate the driving member, said circuit also including a normally closed switch and a throttle responsive switch of which both must be closed to close said circuit, means for closing the throttle responsive switch when the eninge throttle is closed, and means for opening the normally closed switch upon the establishment of the highest ratio power train between said members.

6. In a change-speed transmission apparatus comprising a driving member drivable from a throttle controlled engine through an automatic clutch of which the driving and driven parts are engaged only above a predetermined engine speed, a driven member and a plurality of power trains for establishing forward driving connections of different speed ratios between said members, the combination of synchronizer means for decelerating said driving member to the proper speed relatively to said driven member incident to a change from a lower to a higher ratio power train and operable through one of such power trains as a no-back instrumentality in the event the driving member is decelerated to zero speed, said synchronizer means comprising braking means upon the driven part of said clutch, an electric circuit including a normally closed switch, a throttle responsive switch and a brake actuating mechanism which is operable to actuate said braking means when both said switches are closed, means for closing the throttle responsive switch when the engine throttle is closed, and means for opening the normally closed switch upon the establishment of the highest ratio power train between said members.

7. The combination as set out in claim 6, but wherein the clutch driving and driven parts are those of a turbine type fluid clutch of which the tendency for the driven part to follow the movement of the driving part is slight at low engine speeds.

8. In a change-speed transmission apparatus comprising a driving member drivable from a throttle controlled engine through an automatic clutch of which the driving and driven parts are engaged only above a predetermined engine speed, a driven member and a plurality of power trains for establishing forward driving connections of different speed ratios between said members, the combination of synchronizer means for decelerating said driving member to the proper speed relatively to said driven member incident to a change from a lower to a higher ratio power train, said synchronizer means comprising braking means associated with the driving part of said clutch, said braking means when applied being operable through said clutch to retard said driving member, brake applying means for said braking means, throttle responsive means in control of the brake applying means and becoming operable when the engine throttle is closed to cause actuation of the brake applying means, and means operable in conjunction with said clutch for contravening the aforesaid effect of the throttle responsive means when said clutch is disengaged.

9. The combination as set out in claim 8 and wherein there is also means associated with the highest ratio power train and operable to contravene the aforesaid effect of the throttle responsive means when said power train is established between the driving and driven members.

10. In a change-speed transmission apparatus comprising a driving member drivable from a throttle controlled engine through an automatic clutch of which the driving and driven parts are engaged only above a predetermined engine speed, a driven member and a plurality of power trains for establishing forward driving connections of different speed ratios between said members, the combination of synchronizer means for decelerating said driving member to the proper speed relatively to said driven member incident to a change from a lower to a higher ratio power train, said synchronizer means comprising braking means associated with the driving part of said clutch, said braking means when applied being operable through said clutch to retard said driving member, a source of fluid pressure differing from atmospheric pressure, brake applying means becoming operable to apply said braking means when connected with said source, valve means electrically energizable to connect said brake applying means with said source, an electric circuit in control of said valve means and including a throttle responsive switch, a clutch responsive switch and a normally closed switch, said circuit being conditioned for energizing the valve means when all of said switches are closed, means operating to close the throttle responsive switch when the engine throttle is closed, means operable to close the clutch responsive switch when said clutch is engaged, and means for opening the normally closed switch when the highest ratio power train is established between said driving and driven members.

11. In a change-speed transmission apparatus comprising a driving member drivable from a throttle controlled engine, a driven member and a power train including parts respectively associated with said driving and driven members and meshable to establish said power train when synchronized, the combination of braking means for said driving member, throttle controlling means, brake applying means actuable to apply said braking means, an electric circuit including electrically controlled means energizable by the closing of such circuit for causing said braking means to decelerate the driving member, and circuit closing means associated with said throttle controlling means and operable for closing said circuit when the throttle controlling means is disposed in the throttle closing position.

12. In a throttle-controlled engine-driven vehicle, a transmission driving shaft, a speed responsive clutch operative only above a predetermined engine speed for connecting said driving shaft with the vehicle engine, a transmission driven shaft, an over-running power train operably disposed between said shafts and including means for shunting out the over-running feature thereof, brake means for said driving shaft, and brake applying means interlocked with the engine throttle and operative for applying said brake incident to the closing of said throttle.

13. In a throttle-controlled engine-driven vehicle, the combination of a change-speed transmission comprising a driving shaft driven from said engine, a driven shaft operatively connected with the road wheels of the vehicle, an over-running power train interconnecting said shafts and means for shunting out the over-running feature of the said power train, brake means for said driving shaft, and brake applying means interlocked with the engine throttle and operable for applying said brake incident to closing of said throttle.

14. In a change-speed transmission apparatus comprising a driving member drivable from a throttle controlled engine, a driven member and a plurality of power trains for establishing forward driving connections of different speed ratios between said members, the combination of braking means for decelerating said driving member to the proper speed relatively to said driven member incident to a change from a lower to a higher ratio power train, brake applying means operable to apply said braking means, and an electric circuit including electrically controlled means energizable by the closing of said circuit for causing said braking means to decelerate the driving member, said circuit also including a normally closed switch and a throttle responsive switch of which both must be closed to close said circuit, means for closing the throttle responsive switch when the engine throttle is closed, and means for opening the normally closed switch upon the establishment of a predetermined of said power trains between said members.

15. In a change-speed transmission apparatus comprising a driving member drivable from a throttle controlled engine, a driven member and a plurality of power trains for establishing forward driving connections of different speed ratios between said members, the combination of braking means for decelerating said driving member to the proper speed relatively to said driven member incident to a change from a lower to a higher ratio power train, brake applying means operable to apply said braking means, and an electric circuit including electrically controlled means operable upon the attainment of a predetermined status of said circuit, with respect to energization, to operate said brake applying means, said circuit also including a transmission responsive switch and a throttle responsive switch of which both must be in a predetermined condition of operation to establish said circuit status, means for so conditioning the throttle responsive switch when the engine throttle is in engine-idling condition, the transmission responsive switch being normally so conditioned, and means for disrupting such condition of the transmission responsive switch upon the establishment of a certain of said power trains between said members.

16. In a change-speed transmission apparatus comprising a driving member drivable from a throttle controlled engine, a driven member and a plurality of power trains for establishing driving connections of different speed ratios between said members, the combination of braking means for said driving member, throttle controlling means, biasing means urging the throttle controlling means toward closed throttle position for closing the throttle when said controlling means is released, brake applying mechanism actuatable to apply said braking means, an electric circuit including electrically controlled means operable by the effectuating of such circuit to cause actuation of said brake applying means, and circuit conditioning means associated with the throttle controlling means and coordinated in operation therewith for so predeterminedly conditioning said circuit pursuant to disposal of the throttle controlling means in the closed throttle position under the influence of said biasing means.

17. In a change-speed transmission apparatus comprising a driving member drivable from a throttle controlled engine, a driven member and a plurality of power trains for establishing forward driving connections of different speed ratios between said members, the combination of braking means for decelerating said driving member to the proper speed relatively to said driven member incident to a change from a lower to a higher ratio power train, fluid actuatable brake applying means operable to apply said braking means, switch control means operable under control of the transmission, and an electric circuit including an electrically controlled fluid valve operable to admit actuating fluid to said brake applying means and also including a plurality of switches controlling said electrically controlled fluid valve, one of said switches being controlled by the throttle and the other being controlled by said switch control means for overruling the throttle control switch when the transmission is connected for operation in a predetermined power train.

18. In a change-speed transmission apparatus comprising a driving member drivable from a throttle controlled engine, a driven member and a plurality of power trains for establishing forwarding driving connections of different speed ratios between said members, the combination of braking means for decelerating said driving member to the proper speed relatively to said driven member incident to a change from a lower to a higher ratio power train, switch control means operable under control of a certain of said power trains, an electric circuit including electrically controlled means operable by the effectuating of said circuit to cause application of said braking means, said circuit also including a switch under control of said switch control means and a throttle responsive switch of which both switches must be predeterminedly actuated to effectuate said circuit, the first named switch being normally so predeterminedly actuated, means for so predeterminedly actuating the throttle responsive switch incident to closing the engine throttle, and said switch control means being operable to disrupt said normal condition the first named switch incident to the establishment of said certain power train.

19. In a change-speed transmission apparatus comprising a drive member drivable from a power source controllable in power output, a driven member and a plurality of power trains for establishing driving connections of different speed ratios between said members; means for facilitating a shift in said driving connections comprising means for braking said drive member, an electric circuit for controlling said braking means, and means conditioning the electric circuit coordinately with a diminished power output from said power source so as to function the braking means and thereby decelerate the drive member.

20. In a change-speed transmission apparatus comprising a drive member drivable from a power source controllable in power output, a driven member and a plurality of power trains for establishing driving connections of different speed ratios between said members; means for facilitating a shift in said driving connections, comprising an electrically energizable control circuit, braking means under control of said control circuit and operable coordinately with attainment of a predetermined energization status of such circuit to effect a braking action upon said drive member, manipulatable means for controlling the power output of said power source, and circuit control means operable to bring about said status of said circuit coordinately with the disposal of said manipulatable means in a position causing substantially diminished power output from said source.

21. In a change-speed transmission apparatus for drivingly connecting a power source of controllable power output with a driven member, the combination of a control member manually manipulatable to control such power output but biased to return to an idling position causing diminished power output when released, an overrunning power train establishable in driving relation between said power source and said driven member, a power train of higher ratio including relatively rotatable parts in an unsynchronized condition during operation of the overrunning train and disposable in cooperative relation to effect a shift between said trains by establishing said higher ratio train in driving relation between said power source and said driven member upon deceleration of one of said parts into synchronism with the other, and means for expediting said shift, comprising an electrically energizable control circuit, braking means under control of said control circuit and operable coordinately with attainment of a predetermined status of such circuit, with respect to its energization, to effect a braking action upon said one part for decelerating it to the aforesaid synchronism, and circuit control means operable coordinately with said manually manipulatable member to bring about said status of said circuit pursuant to the return of such control member to substantially said idling position.

22. In a change-speed transmission apparatus comprising a driving member drivable from a throttle controlled engine, a driven member and a plurality of power trains for establishing forward driving connections of different speed ratios between said members, the combination of braking means for said driving member, and brake applying mechanism actuatable in response to the closing of said throttle for applying said braking means to said driving member, and said brake applying mechanism also being responsive to the condition of a higher speed ratio train of said trains to become incapable of such actuation when such power train is established.

23. In a change-speed transmission apparatus comprising a plurality of power trains of different speed transmitting ratio selectively interposable in driving relation between a load and a power source of which the power output is controllable by manipulation of a manipulatable means, and relatively rotatable clutch parts which are to be synchronized and coupled together as a condition precedent to the establishment of a certain of said trains in said driving relation; the combination of braking means associated with one of said clutch parts and appliable to decelerate the same to expedite synchronism of said clutch parts preparatory to the establishment of said power train, brake applying mechanism actuatable to apply said braking means in response to the manipulation of said manipulatable means to a position of diminished power output, and means responsive to the condition of a higher speed transmitting ratio of said trains to defeat application of said brake applying means when such higher ratio train is established.

24. In a change-speed transmission apparatus comprising a plurality of power trains of different speed transmitting ratio selectively interposable in driving relation between a load and a power source of which the power output is controllable by manipulation of a manipulatable means, and relatively rotatable clutch parts which are to be synchronized and coupled together as a condition precedent to the establishment of a certain of said trains in said driving relation; the combination of braking means associated with one of said clutch parts and appliable to decelerate the same to expedite synchronism of said clutch parts preparatory to the establishment of said power train, brake applying mechanism actuatable to apply said braking means, an electric circuit for controlling said brake applying mechanism, and means operable coordinately with said manipulatable means to condition said electric circuit for causing actuation of said brake applying mechanism upon disposal of the manipulatable means in a position of diminished power output.

25. In a change-speed transmission apparatus comprising a plurality of power trains of different speed transmitting ratio selectively interposable in driving relation between a load and a power source of which the power output is controllable by manipulation of a manipulatable means, and relatively rotatable clutch parts which are to be synchronized and coupled together as a condition precedent to the establishment of a certain of said trains in said driving relation; the combination of braking means associated with one of said clutch parts and appliable to decelerate the same to expedite synchronism of said clutch parts preparatory to the establishment of said power train, brake applying mechanism actuatable to apply said braking means in response to the manipulation of said manipulatable means to a position of diminished power output, and means operable coordinately with the establishment of said power train to defeat application of said brake applying means.

OSCAR H. BANKER.